April 30, 1957 P. A. MILLER 2,790,614
SUPPORT CLIP FOR A PIPE
Filed March 29, 1954
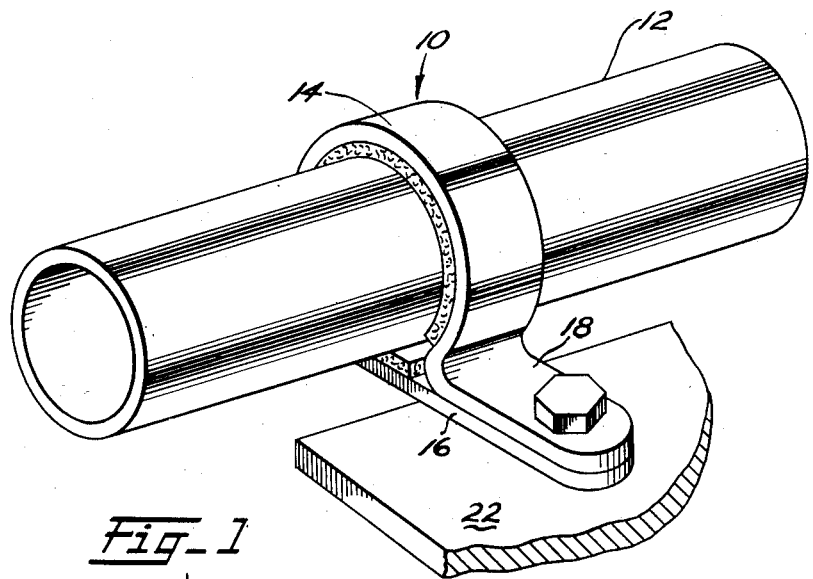
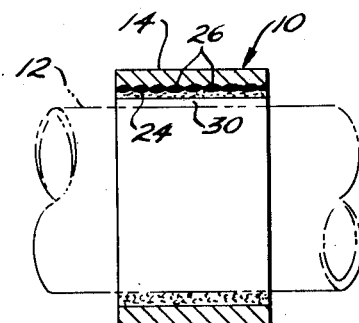
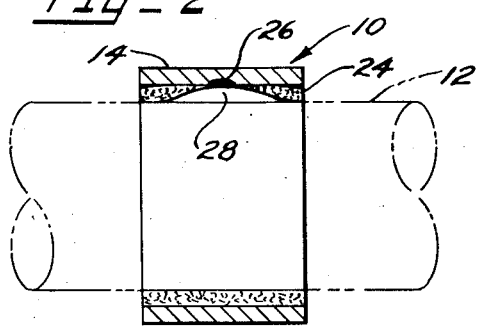
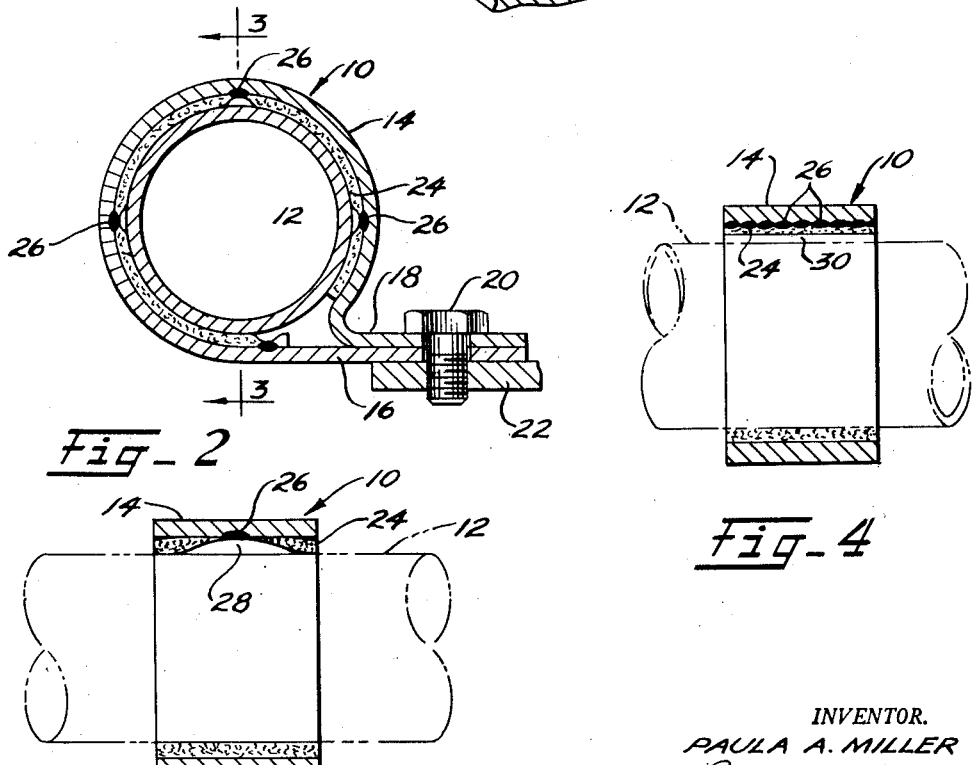
INVENTOR.
PAULA A. MILLER
BY Roger B. McCormick
ATTORNEY United States Patent Office 2,790,614
Patented Apr. 30, 1957

2,790,614

SUPPORT CLIP FOR A PIPE

Paula A. Miller, Forest Hills, N. Y., assignor to The Preferred Engineering and Research Corporation, Hartford, Conn., a corporation of Connecticut Application March 29, 1954, Serial No. 419,376

2 Claims. (Cl. 248—74)

This invention relates to pipe support structure and, more specifically, the invention relates to improvements in a support band for firmly holding a pipe without inflexibly clamping the same.

It is the general object of the invention to provide a retaining or support clip for a fluid conduit, such as a metal pipe, which will firmly support such a pipe without the difficulties and failures which occur in the common or conventional support bands and pipe brackets.

In this connection, it should be noted that the conventional pipe support or clamp which tightly embraces the pipe for support purposes is not entirely satisfactory in installations wherein the ambient temperature may vary over a wide range as, for example, from minus 130° F. to plus 1600° F. It has been found that the support clip will sometimes break from expansion or contraction due to temperature changes and at other times the heat transferred through the clip will cause failure in the pipe or conduit. Another source of failure is caused by the rigid connection between the support clip and the conduit and is most particularly noticeable in installations wherein the conduit is subjected to vibration. In such installations, the stresses due to vibration are concentrated in the clip or in the conduit immediately adjacent the clip and fatigue failure may occur. In addition, if the conduit is subjected to vibration there may be friction between the conduit and support clip such as will cause wear of one or the other of said elements and ultimate failure thereof.

In accordance with the present invention, there is provided a support clip which has an inner layer or pad which surrounds and engages the conduit or pipe to firmly support the same and to dampen vibration thereof without concentrating the stresses therein. More specifically, the support structure comprises a metallic band or strap formed with a circular body portion to surround the pipe and a pad comprising a stranded metal cushion is secured inside the clip to engage the conduit. The adjacent ends of the strap or band are deflected and joined together as a projecting appendage which may be detachably secured to a rigid frame or body.

While it will be quite apparent that the stranded metallic cushion will dampen vibration of the pipe or conduit, it is less apparent but nonetheless important to observe that the said cushion provides air space between the metallic band or strap and the conduit so that heat transfer therebetween is reduced. The metallic cushion will withstand heat which would break down a fabric or rubber pad. Another advantage in the present structure resides in the electrical contact afforded by the metallic cushion whereby the support band or clip may be utilized as a conductor for grounding the pipe or conduit or for other electrical connections thereto.

The aforementioned objects and advantages of the invention, as well as others, will become apparent to those skilled in the art from the following detailed description of the annexed drawing wherein, Fig. 1 is a pictorial illustration of the device which is shown as supporting a length of pipe;

Fig. 2 is a transverse sectional view through the support clip and pipe;

Fig. 3 is a longitudinal sectional view through the clip wherein the pipe is shown in outline only, and Fig. 4 is a view similar to Fig. 3 but showing a slight modification of the support device.

As shown in Fig. 1, the support structure 10 is arranged to surround and support a pipe 12. The said support or clip comprises an elongated metal band 14 having a body of substantially circular form with its end portions 16 and 18 adjacent one another. One end portion 16 extends substantially tangentially from the body portion of the band, while the other end portion 18 is bent at an acute angle to overlie the portion 16 so that a screw 20 may be passed through registering openings in the projecting end portions and secured to a rigid frame or body indicated generally at 22.

It is important to note that the circular body portion of the support band 10 is larger in diameter than the pipe 12 which it is to support. This provides space for a cushion 24 which is disposed between the band and the pipe so as to surround and engage the pipe when the clip is mounted as shown. The said cushion 24 is formed of metallic wire strands which may be interwoven in the manner of a metal screen or the said strands may be heterogeneously intermingled as a very porous pad similar to steel wool. The said cushion or pad is cut as a strip of substantially the same width as the metal band or strap 14 and is secured within the said metal strap by resistance welds 26, 26. As shown in the drawing, the resistance welded areas or spot welds 26, 26 are circularly spaced about the body portion of the band. At each welded spot, the pad is compacted and an indentation 28 is defined on the inner surface of the pad or cushion 24. This has an advantage in that air is permitted to freely circulate within the indentation so as to reduce heat transfer from the metal band 14 to the conduit 12, and in all areas of the pad 24 the spaces between the strands of wire also permit circulation of air so as to reduce heat transfer.

If desired, the resistance weld can be of the seam type as shown in Fig. 4 wherein a series of spot welds 26, 26 are provided between the metal band 14 and the wire cushion 24 so as to define a channel-like depression 30 which extends from side-to-side of the band to further facilitate air flow between the band and the pipe.

The aforedescribed band and metal cushion will support the pipe firmly but will permit limited vibration thereof. More specifically, it may be said that if the installation or surrounding environment causes vibration of said pipe, the cushion will continue to dampen vibration without causing localized stresses in the support structure or within the pipe adjacent the support structure. The attached pad or cushion also has the advantage of reducing heat transfer between the support band and pipe such as may be held to account for failure in prior devices of a generally similar nature. In addition, the cushioned clip in providing metal-to-metal contact from the pipe to the frame 22 may be utilized as an electrical conductor for the purpose of grounding the pipe or for providing other electrical connections thereto.

While the invention has been described with specific reference to the drawing, it is not the intent to limit the scope of the invention to the embodiments shown and described otherwise than indicated by the claims which follow.

I claim as my invention:

1. A heat dissipating, electrically conductive shock mount and support structure for securing a pipe or the like to a body, said support structure comprising an elongated metal band formed into an openable, substantially circular loop adapted to surround a pipe in spaced relationship, said loop being formed with the ends of the band extending generally tangentially therefrom in superposed relationship for securing the support structure to a body, and a preformed resilient wire mesh pad in the form of a strip of substantially the same width as the metal band and secured on the inside of the loop to surround and engage the pipe, the pad being secured to the loop by a plurality of resistance welds spaced around the loop, and the pad being compacted at each weld to define an air space between the pad and the pipe.

2. A shock mount and support structure for securing a pipe or the like as defined in claim 1 wherein each of the welds is linear and extends generally longitudinally of the band from one side edge thereof to the other and whereby the air spaces defined at the welds provide a plurality of generally longitudinal channels between the pad and the pipe for heat dissipating air flow therethrough.

References Cited in the file of this patent
UNITED STATES PATENTS

| | | |
|---|---|---|
| 2,354,642 | Anderson | Aug. 1, 1944 |
| 2,398,595 | Powell | Apr. 16, 1946 |
| 2,421,443 | Torrensen | June 3, 1947 |
| 2,431,379 | Ellinwood | Nov. 25, 1947 |
| 2,658,710 | Titus | Nov. 10, 1953 |
| 2,709,558 | Young | May 31, 1955 |
| 2,715,518 | Bickler | Aug. 16, 1955 |